United States Patent Office 3,235,610
Patented Feb. 15, 1966

3,235,610
DEHYDRATION OF ORGANIC LIQUIDS WITH CARBOXYLATE CATION EXCHANGE RESINS
Charles E. Wymore, Midland, Mich., assignor to The Dow Chemical Company, Midland, Mich., a corporation of Delaware
No Drawing. Filed June 16, 1961, Ser. No. 117,522
8 Claims. (Cl. 260—650)

This invention concerns the dehydration of gases and organic liquids by substantially anhydrous polymeric carboxylate cation exchange resins and the regeneration of the latter for re-use.

It is known to use activated bauxite, silica gel, anhydrite and synthetic zeolites such as molecular sieves as desiccants for dehydrating gases. These materials, while useful, generally require a regeneration at 150°–315° C. and higher to remove sorbed water so that they can be re-used. Otherwise their use is uneconomic.

It has now been discovered that substantially anhydrous polymeric carboxylate cation exchange resins in the alkali metal or ammonium salt form can be used generally to sorb water suspended or dissolved in gases as well as in organic liquids. It is among the advantages of the invention that such resins sorb more water than conventional inorganic water sorbents. Furthermore, the resulting water-laden resins can be regenerated by heating, advantageously while in contact with a stream of a non-reactive gas which is relatively unsaturated with respect to water vapor and preferably with a substantially anhydrous non-reactive gas, e.g., air, nitrogen or carbon dioxide, at a relatively low temperature, i.e., from about 105° to 200° C. at atmospheric or substantially atmospheric pressure, as compared with ca. 315° C. for molecular sieves. In view of the fact that the acid form of carboxylate cation exchange resins have an impractically low water-retention capacity, it was surprising to find that the alkali metal and ammonium salts of the carboxylate salt cation exchange resins had commercially useful water-retention capacities.

Any alkali metal or ammonium salt of a carboxylate cation exchange resin can be used to sorb water from gases or organic liquids, i.e., polymeric forms of acrylic acid, methacrylic acid, maleic acid, the resorcylic acids (2,4-, 2,6- and 3,5-dihydroxybenzoic acids) crosslinked with from about 0.5–30 mole percent of a crosslinking agent having two vinylidene groups, e.g., divinylbenzene, divinyltoluene, divinylxylene, divinylethylbenzene, divinylnaphthalene, methylene-bisacrylamide, diacrylate esters, dimethacrylate esters, diallyl esters, etc. for the acrylic, methacrylic and maleic types, and crosslinked to water insolubility with a 1 to 4 carbon aldehyde for the resorcylic acid types. Such resins are always employed in particulate, spherical or spheroid form, advantageously having a size of 10–100 U.S. mesh.

The polymeric forms of acrylic and methacrylic acid, whether homopolymers or copolymers with vinylaromatic comonomers such as with styrene and its homologs and analogs, and copolymers of maleic acid or anhydride with vinylaromatic comonomers, are prepared by conventional suspension procedures to give particulate, spherical or spheroid products. Polymeric forms of the resorcylic acids are prepared by condensation with aldehydes having 1 to 4 carbon atoms, advantageously formaldehyde, to a water-insoluble state using an emulsion or suspension procedure conventional for making phenol-formaldehyde resinous polymers. Advantageously and preferably, the proportion of carboxylate in the above-mentioned polymers is adjusted to give an exchange capacity in milliequivalents per gram (hereafter meq./g.), dry basis, of 3 to 10. Higher or lower values may be desirable for specific operations. The polymeric carboxylic acids or anhydrides are converted to the corresponding alkali metal and ammonium salts by treatment with a base, e.g., sodium hydroxide, corresponding to the desired salt.

Among the organic liquids which can be dried according to the method of this invention are the aromatic hydrocarbons, such as benzene, toluene and xylene; the aliphatic hydrocarbons such as hexane and propylene, the latter under pressure; and the halogenated hydrocarbons such as 1,1,1-trichloroethane, carbon tetrachloride, methylene chloride, o-dichlorobenzene and monofluorotrichloromethane.

The gases or liquids to be dried can be contacted batchwise with an alkali metal or ammonium salt of a carboxylate salt cation exchange resin, as described above. However, a continuous or cyclic column operation is preferred wherein the gas or organic liquid to be dried is passed downflow or upflow through a column of the stated resin. Advantageously, flow rates between 0.1 and 30 gallons per minute per square foot (hereafter g.p.m./ft.$^2$) are used. A dehydration temperature between about —50° and 90° C., preferably between 0° and 50° C., is used.

In practice, a material which is a gas or an organic liquid at dehydration temperature and is non-reactive with alkali metal or ammonium salts of the said carboxylate resins, except to swell the resin, is passed upflow or, preferably, downflow through a substantially anhydrous bed of the stated carboxylate resin until the effluent has a water content in excess of a desired or pre-determined value, e.g., ca. 1–10 parts per million (hereafter p.p.m.) or above. By non-reactive is meant a material which does not react chemically with the stated resin. The influent is then advantageously transferred to another substantially anhydrous resin bed, while the water-laden resin bed is regenerated by removing its sorbed water, e.g., by blowing down the resin bed to remove interstitial liquid or gas and drying the bed by heating it at 105°–200° C., advantageously while blowing heated air or other non-reactive gas upward therethrough until the sorbed water is substantially completely removed, as determined by a simple test, e.g., a dew point determination or a determination with Karl Fischer reagent.

Nitrogen and air containing 20 p.p.m. to 6600 p.p.m. of water have been used for drying these water-laden resin beds with advantageous results when passed upflow at a rate of about 0.1 lineal ft./sec. at 125° C. If very complete regeneration is required, a small amount of dry purge gas is used at the end of the regeneration as a finishing step. The water-laden resin can also be regenerated by heating it under vacuum at a lower temperature down to —50° C.

The liquid or gas to be dehydrated is thereafter cycled to the regenerated resin bed as needed. Advantageously, gases and organic liquids containing up to about 15 weight percent of water are dehydrated by the process of this invention. Once determined, regeneration conditions are repeated as needed. Generally, regeneration is carried out so that the regenerated resin bed is substantially anhydrous, i.e., until it has no more than ca. 0.5 weight percent of water. Some applications require less rigorous regeneration of the water-laden resin.

The following examples describe completely specific embodiments of the method of this invention and the best mode contemplated by the inventor of carrying out the invention. The examples are in illustration and not in limitation of the invention.

*Example 1*

A $5/16$ inch by 30 inch cylindrical column of Amberlite IRC50 resin, a carboxylate cation exchange resinous copolymer of methacrylic acid and divinylbenzene in the potassium salt form, 20–50 U.S. mesh size, having an acid-form capacity of 3.5 meq./ml., wet basis, and an acid-form moisture content of 43–53%, was dried for 24 hours at 110° C. in a conventional oven followed by 24 hours at 100° C. in a vacuum oven. An influent of 1,1,1-trichloroethane containing about 198 p.p.m. water was passed downflow through the described resin bed at a flow rate of 10 g.p.m./ft.$^2$. The capacity of the resin was greater than 26 pounds of water sorbed per 100 pounds of dry resin. Effluent then was still substantially anhydrous.

Hexane containing ca. 0.1% water can be dehydrated with equally advantageous results.

*Example 2*

Ethanol containing ca. 2.5% water was dried by passing it downflow at a rate of 0.5 g.p.m./ft.$^2$ through a ½ inch by 62 inch cylindrical column of Amberlite XE-89 resin, a potassium salt form of the copolymer of acrylic acid and divinylbenzene having an acid-form capacity of 4.2 meq./ml., water wet resin, and an acid-form moisture content of 52–60%. The resin was dried before use, as in Example 1. An amount of 10 pounds of water was sorbed per 100 pounds of dry resin, to give an effluent having ca. 0.9% water. The sodium salt form of resin has a somewhat higher water-sorption capacity.

Equally advantageous results are obtained in the drying of air, benzene, carbon tetrachloride, monofluorotrichloromethane and ortho-dichlorobenzene.

Deeper resin beds, multiple resin beds in series, and smaller particle size resins can be used when it is desired to dehydrate more completely.

What is claimed is:
1. A cyclic method for removing water from organic liquid materials containing up to 15 weight percent water by passing said material through a bed of a substantially anhydrous resinous polymeric carboxylate cation exchange resin salt of the group consisting of alkali metal and ammonium salts, said material being non-reactive with said resin salts, heating the resulting water-laden resin to a temperature between 50° and 200° C. for a time sufficient to remove sorbed water from said resin and recycling said resin to the water sorbing cycle.

2. The method of claim 1 wherein the water-laden resin is heated in the presence of a stream of a non-reactive gas.

3. The method of claim 1 wherein the resin is in the sodium salt form.

4. The method of claim 1 wherein the resin is in the potassium salt form.

5. The method of claim 1 wherein the organic liquid is an aromatic hydrocarbon.

6. The method of claim 1 wherein the organic liquid is an aliphatic hydrocarbon.

7. The method of claim 1 wherein the organic liquid is a halogenated hydrocarbon.

8. The method of claim 1 wherein the water-laden resin is heated by a stream of a heated non-reactive gas.

References Cited by the Examiner

UNITED STATES PATENTS

| | | | |
|---|---|---|---|
| 2,684,331 | 7/1954 | Bauman | 210—24 |
| 2,852,432 | 9/1958 | Phillips | 210—24 |
| 2,858,333 | 10/1958 | Brower | 252—194 X |
| 3,022,259 | 2/1962 | Pearce | 210—41 |
| 3,118,747 | 1/1964 | Codignola et al. | 55—33 |

FOREIGN PATENTS

| | | |
|---|---|---|
| 209,093 | 11/1956 | Australia. |
| 802,403 | 10/1958 | Great Britain. |

OTHER REFERENCES

Sarin et al. article, Journal of Scientific and Industrial Research (India), 16A (1957), pp. 133–135 (C.A. 51; 1957, p. 13265i).

MORRIS O. WOLK, *Primary Examiner.*

ALONZO D. SULLIVAN, *Examiner.*